United States Patent
Liang et al.

(10) Patent No.: US 11,081,958 B2
(45) Date of Patent: Aug. 3, 2021

(54) DC-DC CONVERTER WITH CURRENT LOOP GAIN

(71) Applicant: TEXAS INSTRUMENTS INCORPORATED, Dallas, TX (US)

(72) Inventors: Jian Liang, Shanghai (CN); Weicheng Zhang, Changhai (CN); Linghan Xie, Wuxi (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/805,251

(22) Filed: Feb. 28, 2020

(65) Prior Publication Data

US 2021/0119533 A1 Apr. 22, 2021

Related U.S. Application Data

(63) Continuation of application No. PCT/CN2019/111963, filed on Oct. 18, 2019.

(51) Int. Cl.
*H02M 3/156* (2006.01)
*H02M 1/32* (2007.01)

(52) U.S. Cl.
CPC .............. *H02M 3/156* (2013.01); *H02M 1/32* (2013.01)

(58) Field of Classification Search
CPC ............ H02M 1/08; H02M 1/32; H02M 1/36; H02M 3/04; H02M 3/156; H02M 3/3158; H02M 2001/0009; H02M 2001/0025
See application file for complete search history.

(56) References Cited

U.S. PATENT DOCUMENTS

| | | | | |
|---|---|---|---|---|
| 7,808,218 B2* | 10/2010 | Xu | ............. | H02M 3/156 323/222 |
| 9,190,910 B2* | 11/2015 | Teh | ............. | H02M 3/1588 |
| 10,581,325 B1* | 3/2020 | Munroe | ............. | H02M 3/158 |
| 2011/0089918 A1 | 4/2011 | Chang | | |
| 2013/0328534 A1 | 12/2013 | Hsieh | | |
| 2016/0006336 A1* | 1/2016 | Bennett | ............. | H02M 3/158 323/271 |
| 2018/0152103 A1* | 5/2018 | Mansri | ............. | H02M 3/156 |
| 2019/0181754 A1* | 6/2019 | Ash | ............. | H02M 3/157 |
| 2020/0127565 A1* | 4/2020 | Liang | ............. | H02M 3/156 |

FOREIGN PATENT DOCUMENTS

| CN | 102141816 A | 8/2011 |
|---|---|---|
| CN | 208835991 U | 5/2019 |

OTHER PUBLICATIONS

Search Report for PCT/CN2019/111963, dated Jun. 24, 2020, 3 pages.

* cited by examiner

*Primary Examiner* — Matthew V Nguyen
(74) *Attorney, Agent, or Firm* — Michael A. Davis, Jr.; Charles A. Brill; Frank D. Cimino (57) ABSTRACT

A converter system includes a first switch, a first sensing unit configured to generate a first sensed signal proportional to a current through the first switch, a second sensing unit (118) configured to generate a second sensed signal based on a difference between a reference voltage and a feedback voltage, a DC compensation unit configured to generate a slope peak DC signal relative to a slope peak of a slope compensation signal, and a signal combination unit configured to generate a control signal based on the first and second sensed signals, the slope compensation signal and the slope peak DC signal to switch off the first switch.

19 Claims, 9 Drawing Sheets

DC-DC CONVERTER WITH CURRENT LOOP GAIN

TECHNICAL FIELD

The present disclosure relates to integrated circuits and, more particularly, to a DC-DC converter system with current loop gain.

BACKGROUND

DC-DC converters are widely used to convert an input DC voltage to a desired output DC voltage to drive a load. A DC-DC converter may include a current loop that determines a load current by sensing an inductor current flowing through an inductor that is coupled to the switch node of the DC-DC converter. The sensed information obtained from the current loop is used to regulate the output of the DC-DC converter.

SUMMARY

The present disclosure relates to integrated circuits and, more particularly, to a DC-DC converter system with improved current loop gain. ADC-DC converter system, for example, a switch mode DC-DC converter, usually includes a switch operated between on and off based on a frequency signal, for example, a pulse-width-modulation (PWM) signal, to generate an output DC voltage to a load by periodically storing energy from a source that provides an input DC voltage in a magnetic field of an inductor or a transformer and releasing the energy from the magnetic field. The ratio between the output DC voltage and the input DC voltage is proportional to the duty cycle of the PWM signal.

In one example, the present disclosure provides a converter system including a first switch, a first sensing unit coupled to the first switch, configured to generate a first sensed signal proportional to a current through the first switch, a second sensing unit, configured to generate a second sensed signal based on a difference between a reference voltage and a feedback voltage, a DC compensation unit, configured to generate a slope peak DC signal relative to a slope peak of a slope compensation signal, and a signal combination unit, configured to generate a control signal based on a combination of a difference between the first and second sensed signals and a difference between the slope compensation signal and the slope peak DC signal, wherein the first switch is switched off based on the combination signal.

In another example, the present disclosure provides a method of operating a converter system. The method includes: switching on a first switch, generating a first sensed signal proportional to a current through the first switch, generating a second sensed signal based on a difference between a reference voltage and a feedback voltage, generating a slope peak DC signal relative to a slope peak of a slope compensation signal, generating a control signal based on a combination of a difference between the first and second sensed signals and a difference between the slope compensation signal and the slope peak DC signal, and switching off the first switch based on the combination signal.

DETAILED DESCRIPTION

The present disclosure relates to DC-DC converter systems with current loop gain.

Figure 1:
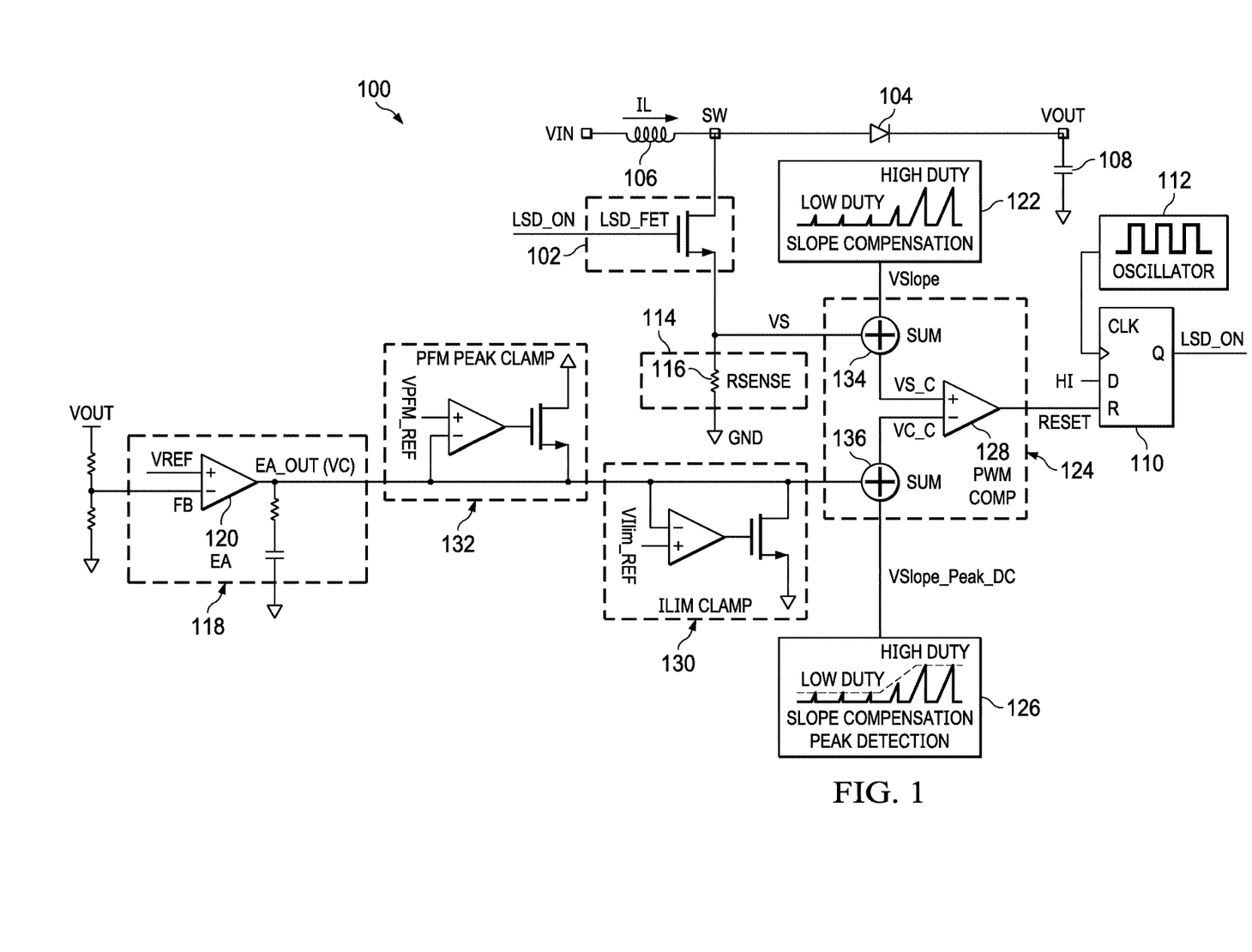
FIG. 1 is a schematic block diagram of a DC-DC converter system in accordance with an implementation of the present disclosure.

Referring now to FIG. 1, a schematic block diagram of a DC-DC converter system 100 in accordance with an implementation of the present disclosure is shown.

The system 100 includes a first switch 102 coupled between a switch node SW and a voltage supply node, for example, a ground node GND, and a diode 104 is coupled between the switch node SW and an output node VOUT of the system, allowing a current flowing from the switch node SW to the output node VOUT. The first switch LSD FET 102, also named as a low side switch, can be a transistor, for example, an N-channel MOSFET that is controlled by a gate drive signal LSD ON to periodically allow a current to follow from the switch node SW towards the voltage supply node GND. In an alternate example, the diode 104 can be replaced by another N-channel MOSFET functioning as a high side switch that is switched on and off reciprocally with the first switch 102.

The system 100 also includes an input inductor 106 coupled between an input node VIN and the switch node SW, and an output capacitor 108 coupled between the output node VOUT and the ground node GND. A drive signal generator 110, for example, a D flip flop, is configured to generate the gate drive signal LSD ON at an output terminal thereof to switch on and off the first switch 102. In one example, the drive signal generator 110 is configured to assert the gate drive signal LSD ON to switch on the first switch 102 based on a clock signal CLK received from an oscillator 112, and to de-assert the gate drive signal LSD ON to switch of the first switch 102 based on a reset signal RESET received at a reset terminal of the D flip flop. The oscillator 112 can be formed within the system 100 or separate from the system 100.

The system 100 includes a first sensing unit 114 coupled to the first switch 102, configured to sense an inductor current IL through the input inductor 106. The first sensing unit 114 is configured to sense the inductor current IL conducted by the first switch 102 when the first switch 102 is on. In one example, a sensing resistor 116 having a resistance RSENSE is coupled between the first switch 102 and the ground node. The first sensing unit 114 generates a first sensed signal VS having a relative or absolute value of a voltage IL*RSENSE across the sensing resistor 116. In another example, the first sensing unit 114 is coupled to drain and source terminals of the first switch 102, such that the first switch 102 (having a conductive resistance RDSon) functions as a sensing resistor. The first sensed signal VS is a relative or absolute value of a voltage IL*RDSon across the first switch 102.

The system 100 also includes a second sensing unit 118, configured to sense the output voltage VOUT of the system 100. The second sensing unit 118 is configured to generate a second sensed signal VC based on a difference between a reference voltage VREF and a feedback voltage FB ("VFB") proportional to the output voltage VOUT. In one example, the second sensing unit 118 includes an error amplifier 120 having: a non-inverting input terminal receiving the reference voltage VREF; and an inverting input terminal receiving the feedback voltage VFB; and an output terminal outputting the second sensed signal VC based on the difference between the reference voltage VREF and the feedback voltage VFB.

In a fixed-frequency current mode control, the system 100 is configured to be regulated based on a difference between the first and second sensed signals. Due to varying of a duty cycle of the system 100, e.g. a duty cycle of a switch signal generated at the switch node SW, slope compensation is usually required to avoid sub-harmonic oscillation issue particularly when the duty cycle of the converter is greater than 50%. Therefore, strength of the slope compensation, which usually refers to the amplitude of the slope compensation signal, is configured to increase when the duty cycle of the system 100 increases. The system 100 may include a slope compensation signal generator 122 configured to generate a slope compensation signal Vslope with a frequency based on the clock signal CLK and an amplitude based on the duty cycle of the switch signal at the switch node SW.

The system 100 further includes a signal combination unit 124 coupled between the drive signal generator 110 and the first and second sensing units 114 and 118. The signal combination unit 124 is configured to generate a control signal provided to the reset terminal of the D flip flop 110. In one example, the signal combination unit 124 includes a first summer 134 configured to compensate, such as by adding the slope compensation signal Vslope to the first sensed signal VS to generate a slope compensated signal VS_C.

Figure 2:
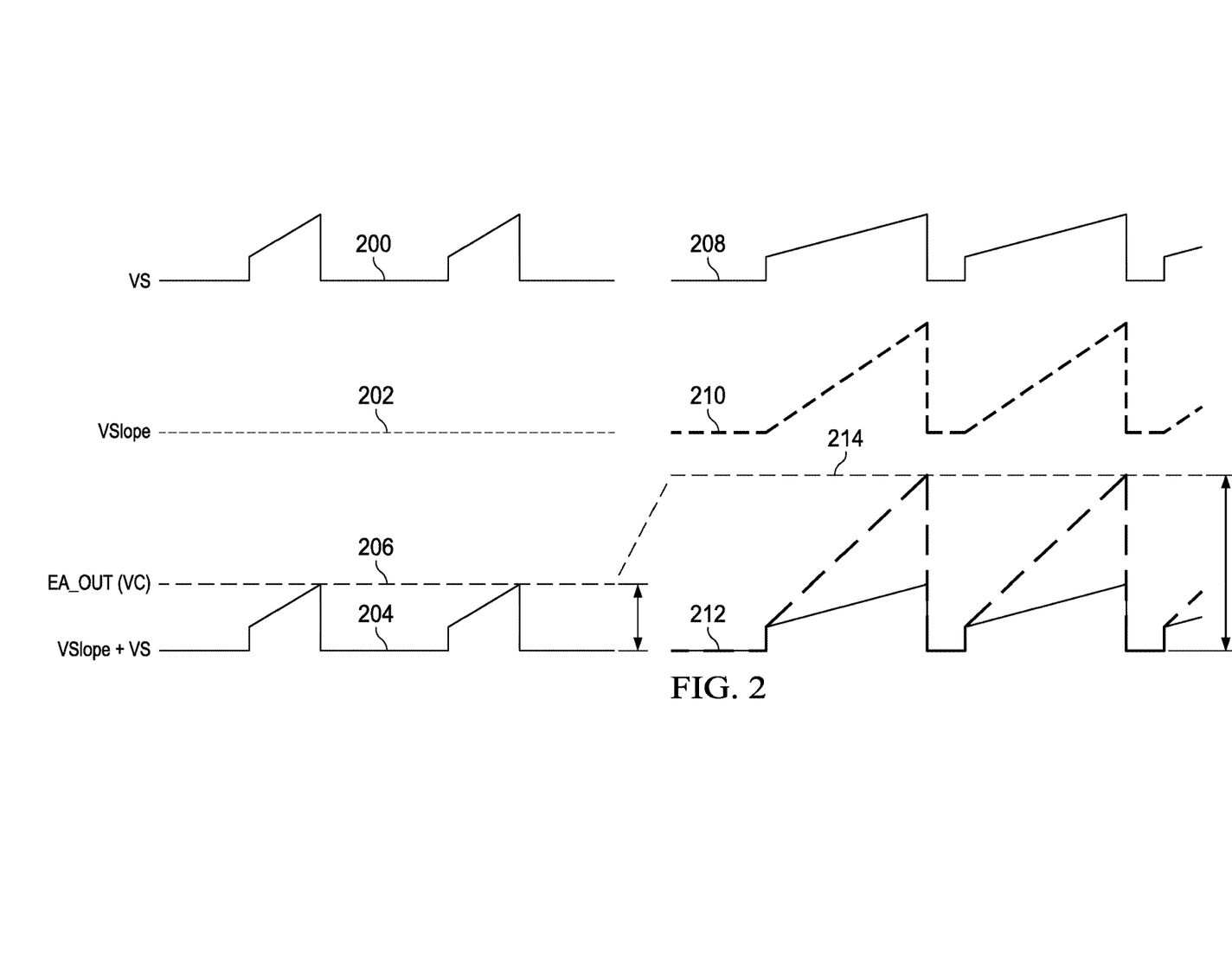
FIG. 2 is an illustrative graph of slope compensation when the DC-DC converter system is operated in low and high duty cycle.

FIG. 2 shows waveforms of the first sensed signal VS 200, the slope compensation signal Vslope 202, the slope compensated signal VS_C 204, and the output EA_OUT (VC) 206 of the error amplifier 120 when the system is in low duty cycle, for example, less than 40%, and waveforms of the first sensed signal VS 208, the slope compensation signal Vslope 210, the slope compensated signal VS_C 212, and the output EA_OUT (VC) 214 of the error amplifier 120 when the system is in high duty cycle, for example, greater than 50%. As illustrated in FIG. 2, when the duty cycle of the system 100 is getting higher, the amplitude of the slope compensated signal VS_C is getting higher and the output EA_OUT (VC) of the error amplifier 120 is getting higher, which may result in a lower DC current loop gain of the system 100.

Referring back to FIG. 1, to eliminate the impact to the DC current loop gain of the system brought by the slope compensation, the system 100 further includes a DC compensation unit 126 configured to generate a slope peak DC signal Vslope_Peak_DC proportional to a slope peak of the slope compensation signal Vslope. The signal combination unit 124 includes a second summer 136 configured to compensate, for example, add the slope peak DC signal Vslope_Peak_DC to the second sensed signal VC to generate a DC compensated signal VC_C. The signal combination unit 124 includes a pulse-width-modulation (PWM) comparator 128 with a first input terminal receiving the slope compensated signal VS_C, and a second input terminal receiving the DC compensated signal VC_C. The PWM comparator 128 is configured to generate the control signal to switch off the first switch 102 if the slope compensated signal VS_C is greater than the DC compensated signal VC_C.

In one example, the system 100 further includes at least one of first and second clamps 130 and 132 coupled between the second sensing unit 118 and the signal combination unit 124. The first clamp ILIM CLAMP 130 is configured to clamp the second sensed signal VC below an upper limit VIlim_REF, so as to clamp the inductor current IL below a current limit Ilim of the system 100. The second clamp PFM PEAK CLAMP 132 is configured to clamp the second sensed signal VC above a lower limit VPFM_REF, so as to clamp peak of inductor current above a peak limit during pulse frequency modulate (PFM) mode. The clamped second sensed signal VC is provided to the signal combination unit 124.

In one implementation, the DC-DC converter system 100 is configured to work as a boost DC-DC converter for converting an input signal, for example, an input voltage VIN, to an output signal, for example, an output voltage VOUT higher than the input voltage VIN. Other architectures of DC-DC converter systems with the same mechanism to sensing a load current and regulate the DC-DC converter system are possible as well. In another example, the DC-DC converter system is a buck converter that converts an input voltage VIN to an output voltage VOUT lower than the input voltage VIN. The sensed inductor 106 can be coupled between the switch node SW and the voltage output node VOUT as an output inductor. A high side switch, as the first switch may be coupled between the switch node SW and the voltage input node VIN, and a low side switch is coupled between the switch node SW and the ground node GND. The load current IL is sensed by sensing a current flowing through the high side switch, and the first sensing signal can be a voltage across the high side switch.

Figure 3:
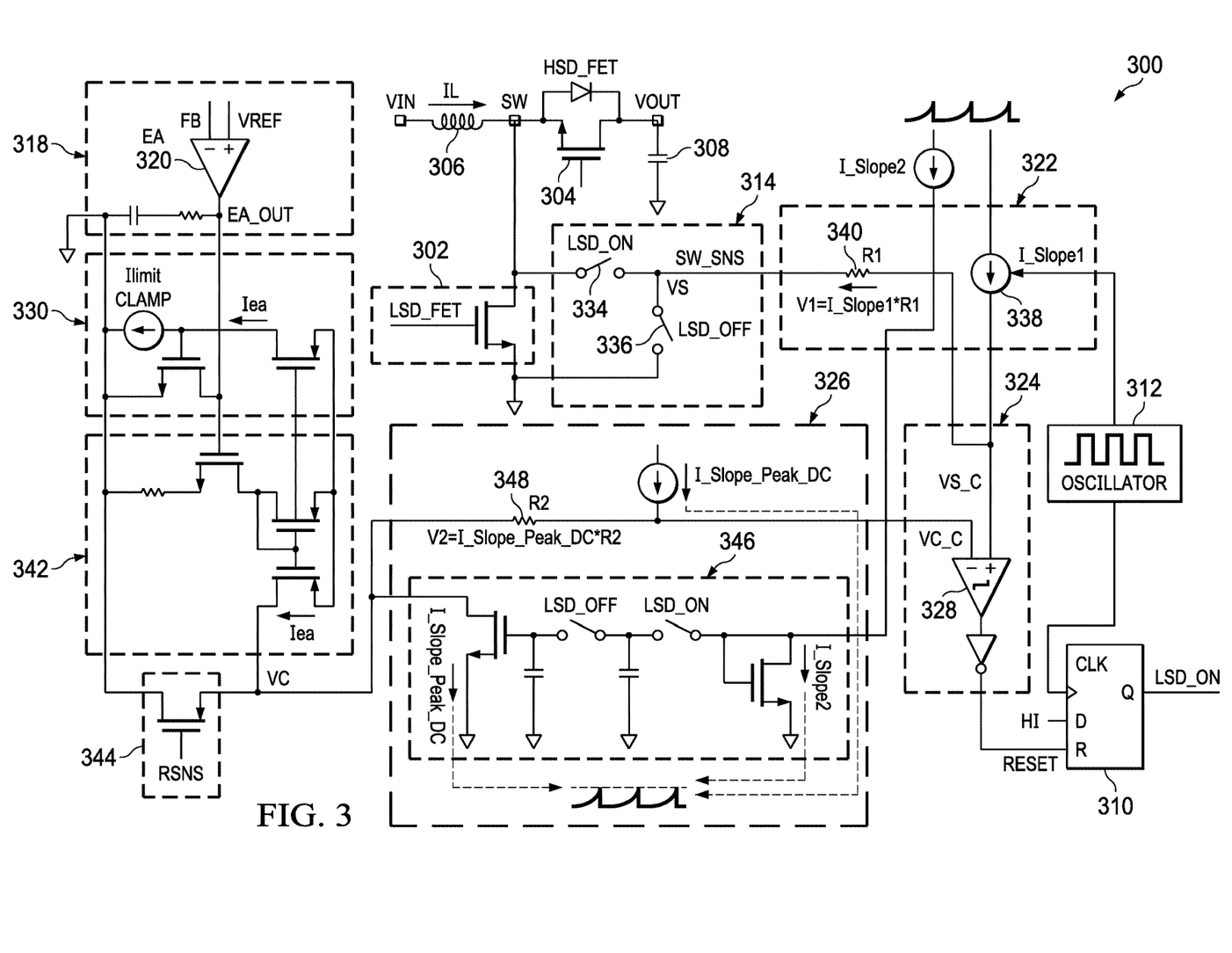
FIG. 3 is a schematic circuit diagram of a DC-DC converter system in accordance with an implementation of the present disclosure.

Referring now to FIG. 3, a schematic circuit diagram of a DC-DC converter system 300 in accordance with an implementation of the present disclosure is shown. In one example, the DC-DC converter system 300 is similar to the DC-DC converter system 100 of FIG. 1. Similarly numbered components in FIG. 3 perform similar functions to the components in FIG. 1 for clarity. The system 300 includes a high side switch HSD FET 304, rather than the diode 104 in FIG. 1, coupled between the switch node SW and the output node VOUT.

In one example, the first sensing unit 314 is configured to sense the inductor current IL through the input inductor 306 by sensing a voltage across the first switch 302. The first sensing unit 314 includes second and third switches 334 and 336 coupled in series between the drain and source terminals of the first switch 302. The second switch 334 is also driven by the drive signal LSD ON of the first switch 302, and the third switch 336 is driven by a signal LSD OFF which is inverted from the drive signal LSD ON. The signals LSD ON and LSD OFF are configured to reciprocally switch on and off the first and high side switches 302 and 304. The first sensed signal VS is a voltage at a joint node SW_SNS between the second and third switches 334 and 336 when the first switch 302 is on.

The slope compensation signal generator 322 includes a current source 338 configured to generate a slope compensation current Islope1 based on the clock signal CLK and the duty cycle of the switch signal at the switch node SW, and a first resistor 340 with a resistance R1 configured to receive the slope compensation current Islope1. A first end of the first resistor 340 is coupled to the joint node SW_SNS and a second end of the first resistor that receives the slope compensation current Islope1 is coupled to the signal combination unit 324.

In one example, the slope compensation signal Vslope is a voltage V1 across the first resistor 340. The first sensed signal VS and the slope compensation signal Vslope are summed at the second end of the first resistor 340 to generate the slope compensated signal VS_C. The slope compensated signal VS_C is provided in accordance with the equations below:

$$VS\_C=VS+V1 \quad (1)$$

where VS=IL*RDSon and V1=Islope1*R1.

Thus when loop is regulated, when $$VS\_C=IL\_Peak*RDSon+Islope1\_Peak\_DC*R1 \quad (2)$$

where IL_Peak is a peak current of the inductor current IL, and Islope1_Peak_DC is a peak DC current of the slope compensation signal Islope1.

Continuing with FIG. 3, a second sensing unit 318 includes an error amplifier 320 configured to generate an error signal EA_OUT based on the difference between the reference voltage VREF and the feedback voltage FB ("VFB"). The system 300 further includes: a voltage-current converter 342 configured to generate a converted current signal IEA proportional to the error signal EA_OUT; and a sensing switch 344 having a conductive resistance RSNS. In one example, the sensing switch 344 is a P-channel MOSFET having: a source terminal for receiving the converted current signal IEA; a drain terminal, coupled to a voltage supply node, such as a ground node; and a gate terminal coupled to a gate driving circuit. In one example, the conductive resistance of the sensing switch 344 has a constant ratio to the conductive resistance of the first switch 302. The sensing switch 344 is configured to receive the converted current signal IEA and generate the second sensed signal VC at the source terminal thereof. In one example, the sensing switch 344 is configured to be constant on. In another example, the sensing switch 344 is configured to be switched on and off concurrently with the first switch 302. In yet another example, the sensing switch 344 can be replaced by a resistor.

The DC compensation unit 326, for example, the compensation unit 126 of the system 100 of FIG. 1, includes a current mirror configured to generate a mirrored slope signal Islope2 equal or proportional to the slope compensation signal Islope1, and a sample-and-hold unit 346 configured to sample a peak current Islope2_Peak_DC of the mirrored slope peak DC signal Islope2 when the first switch 302 is on and hold the peak current Islope2_Peak_DC at an output thereof when the first switch is off, wherein when Islope1=Islope2, $$Islope1\_Peak\_DC=Islope2\_Peak\_DC=I\_slope\_Peak\_DC \quad (3)$$

The DC compensation unit 326 includes a second resistor 348 having a resistance R2. The second resistor 348 has a first end coupled to the source terminal of the sensing switch 344, and a second end that receives a replica of the slope peak DC signal I_slope_Peak_DC and is coupled to the signal combination unit 324.

In one example, the DC compensation signal Vslope_Peak_DC is a voltage V2 across the second resistor 348. The second sensed signal VC and the DC compensation signal Vslope_Peak_DC are summed at the second end of the second resistor 348 to generate the DC compensated signal VC_C. The DC compensated signal VC_C is provided in accordance with the equations below:

$$VC\_C=VC+V2 \quad (4)$$

where VC=IEA*RSNS and V2=I_slope_Peak_DC*R2.

Thus when the loop is regulated, $$VC\_C=IEA*RSNS+I\_slope\_Peak\_DC*R2 \quad (5)$$

The comparator 328 is configured to compare the slope compensated signal VS_C and the DC compensated signal VC_C, and to switch off the first switch 302 through the D flip flop 310 when the slope compensated signal VS_C is greater than the DC compensated signal VC_C.

When the loop is regulated, VC_C=VS_C, combining equations (2), (3) and (5), $$IL\_Peak*RDSon=IEA*RSNS \quad (6)$$

$$IL\_Peak=IEA*RSNS/RDSon \quad (7)$$

As shown in equation (7), with the DC compensation unit 326, sensed IL_Peak is independent from the slope compensation signal Islope1, thus the DC current loop gain of the current loop, including the first switch 320, the first sensing unit 314, the PWM comparator 328 and the D flip flop 310, is not affected by the slope compensation.

Figure 4:
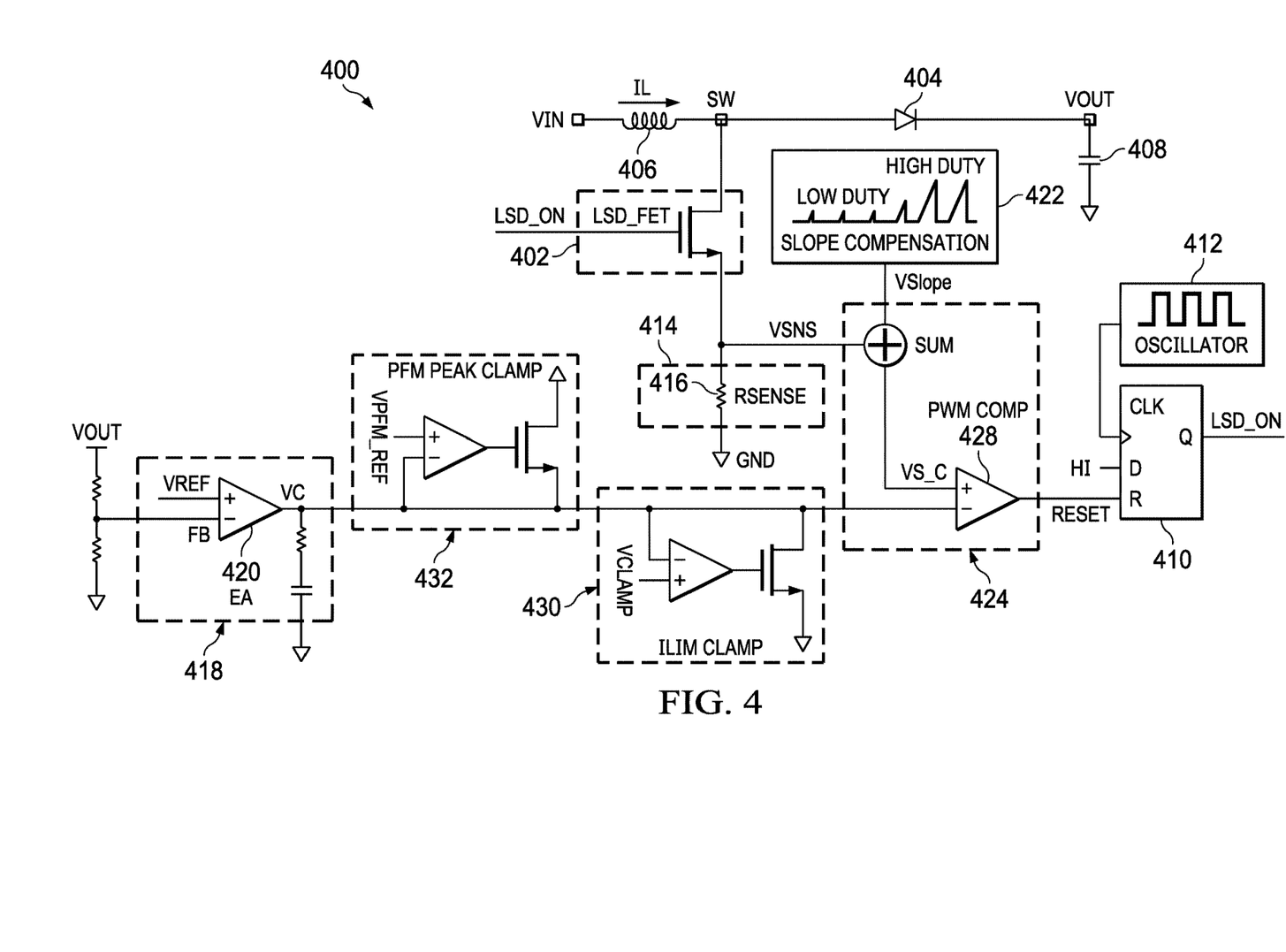
FIG. 4 is a schematic block diagram of a schematic block diagram of a DC-DC converter system without a DC compensation unit.

In comparison, referring to FIG. 4, a schematic block diagram of a DC-DC converter system 400 without a DC compensation unit is shown. The system 400 is substantially similar to the system 100 of FIG. 1 except that the DC compensation unit 126 is not included. At a DC balanced point, similar to the DC-DC converter system 300 of FIG. 3, the slope compensated signal VS_C is provided as:

$$VS\_C=IL\_Peak*RSENSE+Vslope \quad (8)$$

where Vslope is a slope compensation voltage such as Islope1*R1 as shown in FIG. 3. When VC=VS_C, $$IL\_Peak=(VC-Vslope)/RSENSE \quad (9)$$

As shown in equation (9), in the DC-DC converter 400 that is without a DC compensation unit, heavy slope compensation due to large duty cycle can make the DC current loop gain of the current loop small and sensitive to the slope compensation strength and duty cycle. A small current loop gain may result in poor load transient performance and the sensitivity may deteriorate the overall performance of the DC-DC converter system 400.

Figure 5:
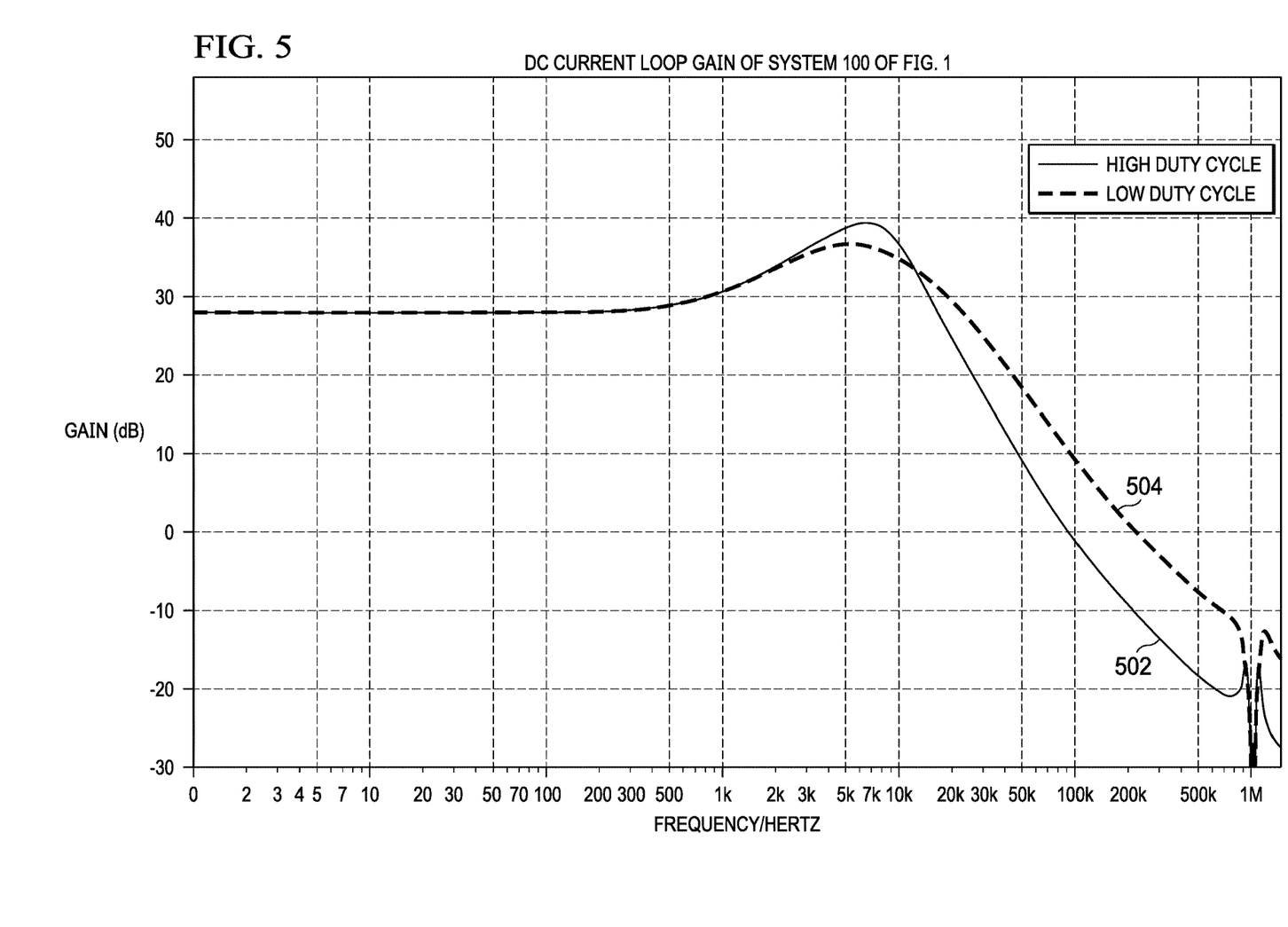
FIG. 5 shows the simulation result of current loop gain of the DC-DC converter system of FIG. 1 operated in low and high duty cycle.
Figure 6:
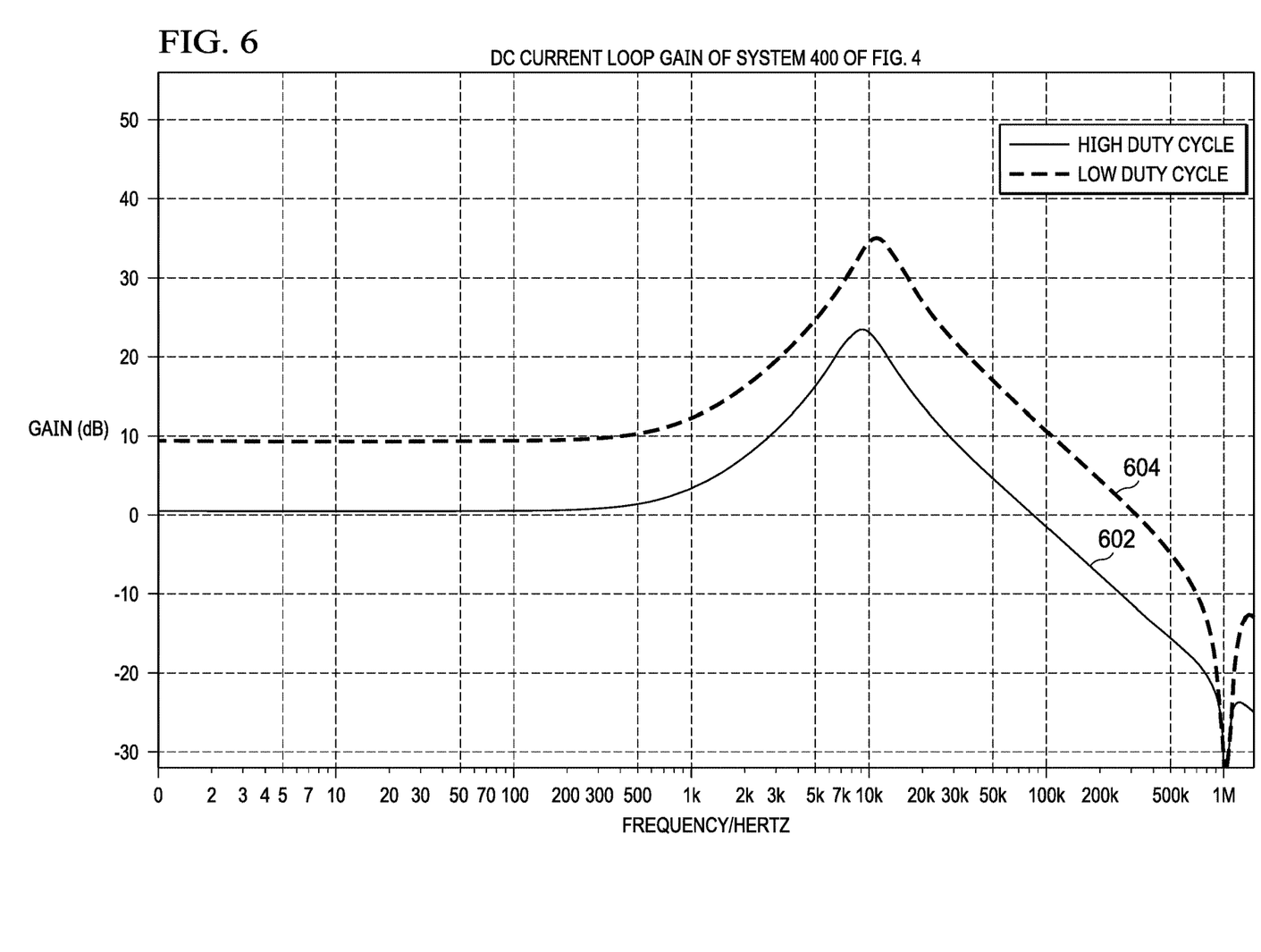
FIG. 6 shows the simulation result of current loop gain of the DC-DC converter system of FIG. 4 operated in low and high duty cycle.

FIGS. 5 and 6 respectively show waveforms of DC current loop gain of the systems 100 and 400 of FIGS. 1 and 4 with same simulation setup: VIN=3V, VOUT=12V; switching frequency FSW=1 MHz, Lind=2.2 uH, where FSW is the switching frequency of the clock signal CLK, and Lind is the inductance of the input inductor 106/406. Two levels of slope compensation strength are simulated, solid lines 502 and 602 refer to the current loop gain under higher slope compensation strength, for example, 3 times of the strength of ideal slope compensation), dot lines 504 and 604 refer to the current loop gain under lower slope compensation strength, for example, 1 time of the strength of the ideal slope compensation strength).

As shown in FIG. 5, the system 100 of the present disclosure achieves a higher DC current loop gain around 28 dB and the current loop gain is substantially independent from the slope compensation strength. In contrast, as shown in FIG. 6, the system 400 without a DC compensation unit, has a much lower DC current loop gain between 1 to 10 dB, and the gain gets lower when the slope compensation strength is higher.

Referring back to FIG. 3, an example of a first clamp 330 coupled between the second sensing unit 318 and the DC compensation unit 326 is shown. The first clamp 330 can be an alternative example of the first clamp 130 of the system 100 of FIG. 1. The first clamp 330 is configured to receive a replica of the current IEA and clamp the current IEA below a reference current limit Ilim_clamp.

According to equation (7), the inductor peak current IL_Peak has a constant ratio to the current IEA, so the current IEA is clamped to limit the induct peak current Ilim. When the IEA is clamped to Ilim_clamp, Ilim is defined in accordance with the equation:

$$Ilim = Ilim\_clamp * RSNS/RDSon \qquad (10)$$

where Ilim is the upper current limit of the inductor current IL. The lower current limit of the inductor current IL can be provided by the second clamp 130 in FIG. 1 in a similar way.

Referring back to FIG. 1, as the DC compensation unit 126 compensates the second sensed signal VC directly rather than compensating the upper limit VIlim_REF, the upper current limit Ilim itself of the inductor current IL is independent from the slope compensation. In addition, as shown in FIG. 1, the need for a separate DC compensation unit for each of the first and second clamps 130 and 132 is eliminated.

Figure 7:
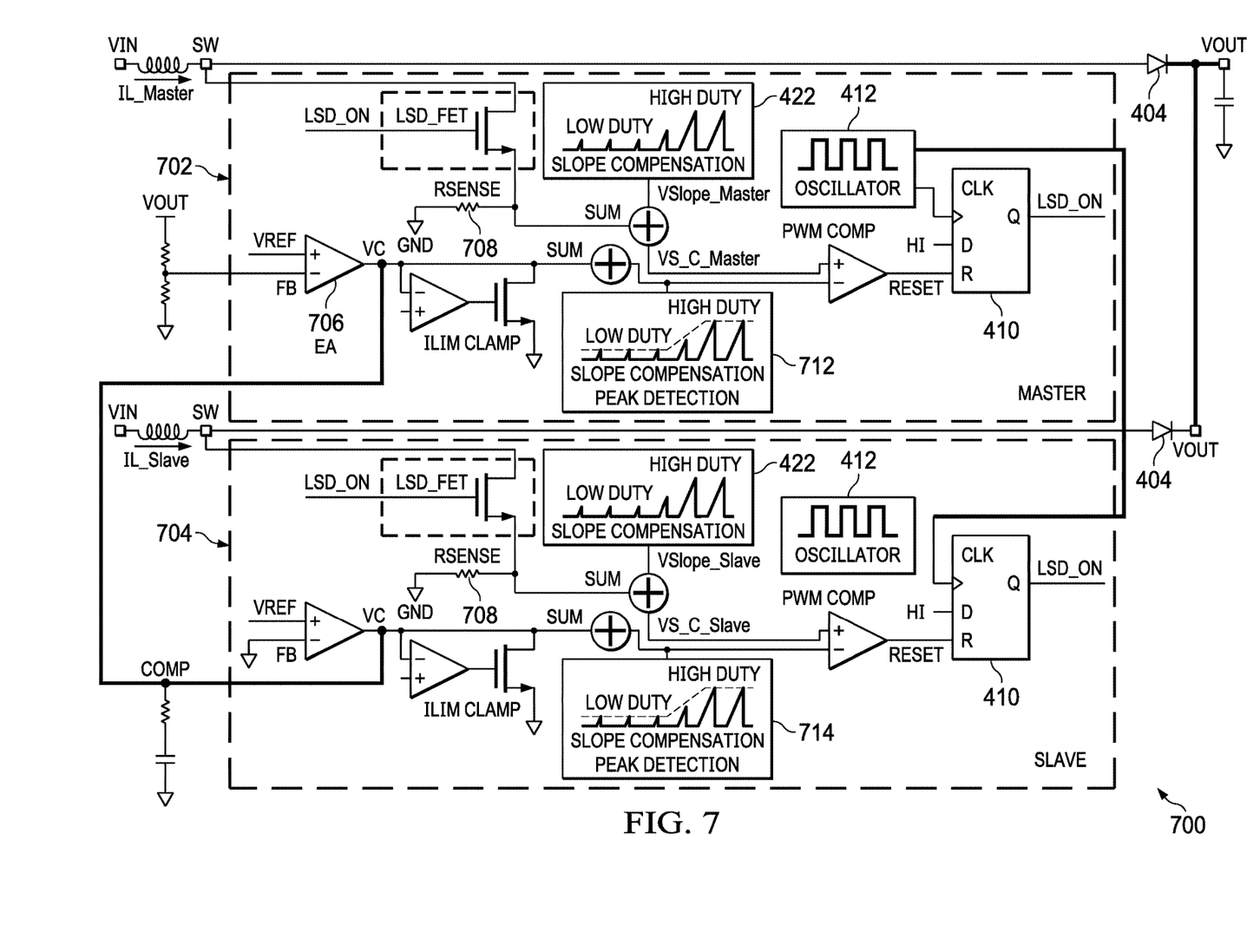
FIG. 7 is a schematic block diagram of a multiple-phase control DC-DC converter system in accordance with an implementation of the present disclosure.

FIG. 7 is a block diagram of a multiple-phase control DC-DC converter system 700 in accordance with an example of the present disclosure. The DC-DC converter system 700 includes master and slave converter parts 702 and 704 which share the output VC of the error amplifier 706, the voltage output VOUT and the clock signal of the master converter part 702. The master converter part 502 includes a master sensing resistor 708 for sensing the master inductor current IL_Master, and the slave converter part 704 includes a slave sensing resistor 710 for sensing the slave inductor current IL_Slave. Inductor current balance between the master converter part 702 and slave converter part 704 is important for such multiple-phase control applications.

At DC balanced point, the peak current IL_Master_Peak of the inductor current IL_master of the master converter part 702 and the peak current IL_Slave_Peak of the inductor current IL_slave of the slave converter part 704 are provided in accordance with the equations below:

$$IL\_Master\_Peak = VC/RSENSE\_master \qquad (11)$$

$$IL\_Slave\_Peak = VC/RSENSE\_slave \qquad (12)$$

As both the peak current IL_Master_Peak of the inductor current IL_master of the master converter part 702 and the peak current IL_Slave_Peak of the inductor current IL_slave of the slave converter part 704 are independent from slope compensation in each converter part, it is easy to achieve inductor current balance between the master converter part 702 and slave converter part 704 by providing sensing resistors 708 and 710 with a same resistance RSENSE.

In contrast, if without the master DC compensation unit 712 of the master converter part 702 and the slave DC compensation unit 714 of the slave converter part 704, the inductor current IL_master of the master converter part 702 and the inductor current IL_slave of the slave converter part 704 would be provided in accordance with the equations below:

$$IL\_Master = (VC - Vslope\_master)/Rsense\_master \qquad (13)$$

$$IL\_Slave = (VC - Vslope\_slave)/Rsense\_slave \qquad (14)$$

As different converter parts will have different slope compensation strength, which may make the current balance difficult.

Figure 8:
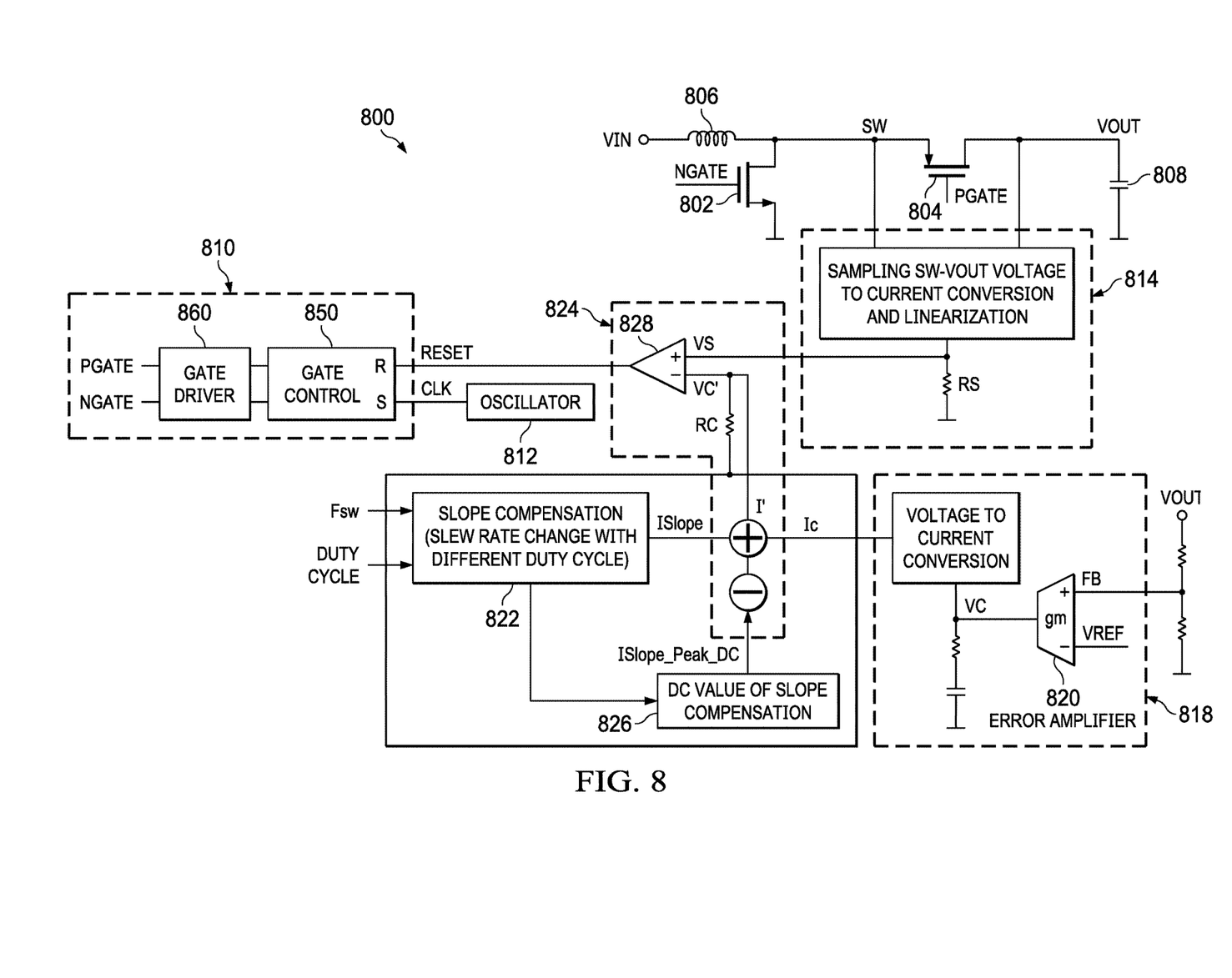
FIG. 8 is a schematic block diagram of a DC-DC converter system in accordance with another implementation of the present disclosure.

FIG. 8 shows a schematic block diagram of a DC-DC converter system 800 in accordance with another implementation of the present disclosure. Different from the system 100 of FIG. 1, the first sensing unit 814 is configured to sense a current through the high side switch 804 coupled between the switch node SW and the voltage output node VOUT of the system 800. The second sensing unit 818 is configured to generate a voltage signal VC based on a difference between a reference signal VREF and a feedback signal FB ("VFB") proportional to an output voltage VOUT of the system 800, and convert the voltage signal VC to a current signal IC as the second sensed signal.

The slope compensation signal generator 822 is configured to generate a slope compensation signal Islope. The DC compensation unit 826 generates a slope peak DC signal I_slope_Peak_DC relative to a slope peak of the slope compensation signal Islope. A difference between the slope compensation signal Islope and the slope peak DC signal I_slope_Peak_DC is generated and combined with the second sensed signal IC to generate a compensated current signal IC'. The DC compensated signal VC' is generated proportional to the compensated current signal IC'. The drive signal generator 810 includes an RS flip flop 650 and a gate driver 680 configured to reciprocally switch on and off the high side and low side switches 804 and 802 based on the clock signal CLK and the control signal RESET.

In yet another implementation, the signal combination unit 824 is configured to compensate the slope compensation signal to one of the first and second sensed signals, and compensate the slope peak DC signal to either one of the slope compensated signal or the other one of the first and second sensed signals that is not compensated with the slope compensation signal.

Figure 9:
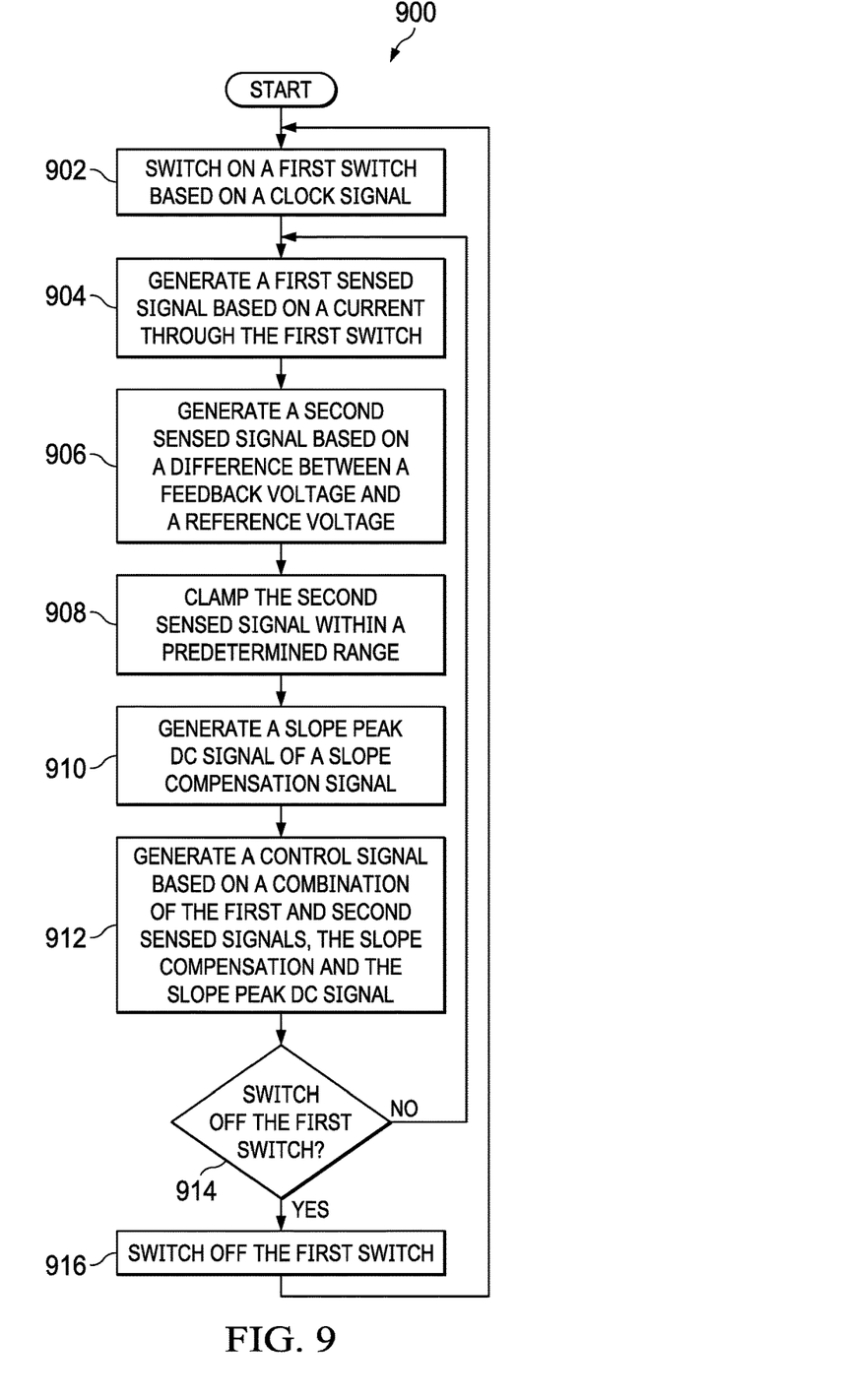
FIG. 9 is a flow chart of a method of operating a DC-DC converter system in accordance with an implementation of the present disclosure.

Referring to FIG. 9, a flow chart of a method 900 for regulating a DC-DC converter system in accordance with an implementation of the present disclosure is shown. With reference to the DC-DC converter system 100 of FIG. 1 that includes the first switch 102 coupled between the switch node SW and a voltage supply node, for example, a ground node GND. The inductor 106 is coupled between the switch node SW and the voltage input node VIN, and the diode 104 or a high side switch is coupled between the switch node SW and the voltage output node VOUT. The first switch 102 is configured to periodically allow the inductor current IL to flow there through.

In one implementation, the DC-DC converter system 100 is configured to work as a boost DC-DC converter for converting an input signal, for example, an input voltage VIN, to an output signal, for example, an output voltage VOUT higher than the input voltage VIN.

Other architectures of DC-DC converter systems with the same mechanism to sensing a load current and regulate the DC-DC converter system are possible as well. In another example, the DC-DC converter system is a buck converter that converts an input voltage VIN to an output voltage VOUT lower than the input voltage VIN. The sensed inductor 106 can be coupled between the switch node SW and the voltage output node VOUT as an output inductor. A high side switch, as the first switch may be coupled between the switch node SW and the voltage input node VIN, and a low side switch is coupled between the switch node SW and the ground node GND. The load current IL is sensed by sensing a current flowing through the high side switch, and the first sensing signal can be a voltage across the high side switch.

Starting at step 902, the drive signal generator 110 switches on the first switch 102 upon, for example, a rising edge of the clock signal CLK.

At step 904, the first sensing unit 114 generates a first sensed signal VS proportional to a current IL through the first switch 102. In one implementation, the first sensed signal VS is a voltage across the first switch 102 when the first switch is on. In another implementation, the first sensed signal VS is a voltage across a sensing resistor 116 coupled in series with the first switch 102.

At step 906, the second sensing unit 118 generates a second sensed signal VC based on a difference between a reference voltage VREF and a feedback voltage VFB proportional to an output voltage VOUT of the converter system 100.

At step 908, in one example, the method 900 further includes clamping the second sensed signal VC within a predetermined range by using one or more clamps 130 and 132. For example, the first clamp 130 is configured to clamp the second sensed signal VC under an upper limit VIlim_REF, so as to clamp the inductor current IL below a current limit Ilim of the system 100. The second clamp 132 is configured to clamp the second sensed signal VC above a lower limit VPFM_REF, so as to clamp peak of inductor current above a peak limit during pulse frequency modulate (PFM) mode. The clamped second sensed signal VC is provided to the signal combination unit 124.

At step 910, the DC compensation unit 126 generates a slope peak DC signal Vslope_Peak_DC relative to a slope peak of a slope compensation signal Vslope.

In one example, step 910 includes generating a slope compensation current Islope1 based on the clock signal CLK and a duty cycle of the switch signal at the switch node SW, providing the slope compensation current Islope1 to the first resistor R1, and generating a voltage V1 across the first resistor R1 as the slope compensation signal Vslope.

In one example, generating the slope peak DC signal Vslope_Peak_DC includes generating a mirrored slope compensation current Islope2 proportional to the slope compensation current Islope1, sampling and holding a slope peak DC current I_slope_Peak_DC of the mirrored slope compensation current Islope2, providing the slope peak DC current I_slope_Peak_DC to the second resistor R2, and generating a voltage V2 across the second resistor R2 as the DC compensation signal VSlope_Peak_DC.

At step 912, the signal combination unit 124 generates a control signal RESET based on a combination of a difference between the first and second sensed signals VS and VC and a difference between the slope compensation signal Vslope and the slope peak DC signal Vslope_Peak_DC.

In one example, the signal combination unit 124 compensates, for example, adds, the slope compensation signal Vslope to the first sensed signal VS to generate a slope compensated signal VS_C, and compensates, for example, adds, the slope peak DC signal Vslope_Peak_DC to the second sensed signal VC to generate a DC compensated signal VC_C. The signal combination unit 124 compares the slope compensated signal and the DC compensated signal VS_C and VC_C to generate the control signal RESET.

In another example, with reference to the system 800 of FIG. 8, the signal combination unit 824 compensates, for example, adds, a difference between the slope compensation signal Islope and the slope peak DC signal I_slope_Peak_DC to the second sensed signal IC to generate a compensated second sensed signal VC'. The signal combination unit 824 compares the compensated second sensed signal VC' with the first sensed signal VS to generate the control signal RESET.

At step 916, in the example shown in FIG. 1, if the slope compensated signal VS_C is greater than the DC compensated signal VC_C determined at step 914, the control signal RESET is generated to switch off the first switch 102. In the other example shown in FIG. 8, if the first sensed signal VS is greater than the compensated second sensed signal VC', the control signal RESET is generated to switch off the high side switch 804. The output voltage VOUT is thus regulated by adjusting the duty cycle of the converter system 100/800.

The description of the preferred implementations of the present disclosure has been presented for purposes of illustration and description, but is not intended to be exhaustive or to limit the disclosure to the forms disclosed. Numerous modifications, changes, variations, substitutions, and equivalents will be apparent to those skilled in the art, without departing from the spirit and scope of the present disclosure, as described in the claims.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B by direct connection, or in a second example device A is coupled to device B through intervening component C if intervening component C does not alter the functional relationship between device A and device B such that device B is controlled by device A via the control signal generated by device A.

The invention claimed is:

1. A converter system, comprising:
   a switch;
   a first sensing unit coupled to the switch, the first sensing unit configured to generate a first sensed signal proportional to a current through the switch;
   a second sensing unit, configured to generate a second sensed signal based on a difference between a reference voltage and a feedback voltage;
   a DC compensation unit, configured to generate a slope peak DC signal relative to a slope peak of a slope compensation signal; and
   a signal combination unit coupled to the DC compensation unit and the first and second sensing units, the signal combination unit having a control output and configured to generate a control signal at the control output based on a comparison between: a first sum of the first sensed signal and the slope compensation signal; and a second sum of the second sensed signal and the slope peak DC signal;
   in which the switch is coupled to the control output and configured to switch off responsive to the control signal indicating the first sum is greater than the second sum.

2. The converter system of claim 1, further comprising a slope compensation signal generator configured to generate the slope compensation signal based on a clock signal, wherein the first sum is a slope compensated signal, and the second sum is a DC compensated signal.

3. The converter system of claim 2, wherein the first sensing unit comprises a current sensing resistor coupled in series with the switch, and the first sensed signal is a voltage across the sensing resistor.

4. The converter system of claim 2, wherein the first sensing unit comprises second and third switches coupled between first and second ends of the switch, and the first sensed signal is a voltage across the switch when the switch is on.

5. The converter system of claim 4, further comprising a slope compensation current source configured to generate a slope compensation current based on the clock signal, wherein the slope compensation signal generator includes a resistor having: a first end coupled to a node between the second and third switches; and a second end coupled to the slope compensation current source, in which the slope compensation signal is a voltage across the resistor.

6. The converter system of claim 5, wherein the resistor is a first resistor, and the DC compensation unit comprises:
a current mirror configured to generate a mirrored slope signal responsive to the slope compensation current;
a sample-and-hold unit having an output and configured to sample a mirrored slope peak signal of the mirrored slope signal and hold the mirrored slope peak signal at the output; and
a second resistor coupled between the output of the sample-and-hold unit and the second sensing unit, in which the slope peak DC signal is a voltage across the second resistor.

7. The converter system of claim 6, wherein the second sensing unit comprises:
an amplifier having an amplifier output and configured to generate a control voltage at the amplifier output based on the difference between the reference voltage and the feedback voltage;
a voltage-current converter having a converter input and a converter output, the converter input coupled to the amplifier output, and the voltage-current converter configured to generate a converted current at the converter output, in which the converted current is proportional to the control voltage; and
a resistive element having a first end coupled to the converter output, wherein the second sensed signal is a voltage across the resistive element.

8. The converter system of claim 7, further comprising a clamp coupled to the second sensing unit, the clamp configured to clamp the second sensed signal within a range.

9. The converter system of claim 8, wherein the clamp is configured to clamp the second sensed signal under an upper limit based on an upper current limit of the current through the switch.

10. A method of operating a converter system, comprising:
switching on a switch;
generating a first sensed signal proportional to a current through the switch;
generating a second sensed signal based on a difference between a reference voltage and a feedback voltage;
generating a slope peak DC signal relative to a slope peak of a slope compensation signal;
generating a control signal based on a comparison between: a first sum of the first sensed signal and the slope compensation signal; and a second sum of the second sensed signal and the slope peak DC signal; and
switching off the switch responsive to the control signal indicating the first sum is greater than the second sum.

11. The method of claim 10, further comprising:
generating the slope compensation signal based on a clock signal, wherein the first sum is a slope compensated signal, and the second sum is a DC compensated signal.

12. The method of claim 11, wherein generating the slope compensation signal comprises:
generating a slope compensation current based on the clock signal; and
providing the slope compensation current to a resistor, in which the slope compensation signal is a voltage across the resistor.

13. The method of claim 12, wherein the resistor is a first resistor, and generating the slope peak DC signal comprises:
generating a mirrored slope compensation current proportional to the slope compensation current;
sampling and holding a slope peak DC current of the mirrored slope compensation current; and
providing the slope peak DC current to a second resistor, in which the slope peak DC signal is a voltage across the second resistor.

14. The method of claim 10, wherein generating the slope peak DC signal comprises sampling and holding the slope peak of the slope compensation signal.

15. The method of claim 10, wherein the first sensed signal is a voltage across the switch when the switch is on.

16. The method of claim 10, wherein the first sensed signal is a voltage across a current sensing resistor coupled in series with the switch.

17. The method of claim 10, further comprising clamping the second sensed signal.

18. The method of claim 17, wherein the second sensed signal is clamped under an upper limit, based on an upper current limit of the current through the switch.

19. The method of claim 17, wherein the second sensed signal is clamped above a lower limit when the converter system is operating in a pulse frequency modulate (PFM) mode.

\* \* \* \* \*